US008491385B2

(12) United States Patent
Miodunski (10) Patent No.: US 8,491,385 B2
(45) Date of Patent: Jul. 23, 2013

(54) GAMING MACHINE WITH PLAYER SCALABLE VIDEO-DISPLAYED GAME ELEMENTS

(75) Inventor: Robert L. Miodunski, Henderson, NV (US)

(73) Assignee: AGS, LLC, Las Vegas, NV (US)

( * ) Notice: Subject to any disclaimer, the term of this patent is extended or adjusted under 35 U.S.C. 154(b) by 0 days.

(21) Appl. No.: 13/248,416

(22) Filed: Sep. 29, 2011

(65) Prior Publication Data

US 2013/0084977 A1 Apr. 4, 2013

(51) Int. Cl.
*G06F 17/00* (2006.01)

(52) U.S. Cl.
USPC ............................................. 463/31

(58) Field of Classification Search
USPC ............................... 463/16–25, 31
See application file for complete search history.

(56) References Cited

U.S. PATENT DOCUMENTS

| 6,652,378 B2 * | 11/2003 | Cannon et al. ................... 463/20 |
| 6,860,810 B2 * | 3/2005 | Cannon et al. ................... 463/20 |
| 8,241,124 B2 * | 8/2012 | Kelly et al. ...................... 463/34 |
| 2007/0243934 A1 * | 10/2007 | Little et al. ....................... 463/40 |
| 2008/0102916 A1 * | 5/2008 | Kovacs et al. ................... 463/16 |
| 2008/0188279 A1 * | 8/2008 | Seelig et al. .................... 463/19 |
| 2012/0220360 A1 * | 8/2012 | Kelly et al. ...................... 463/20 |
| 2012/0258803 A1 * | 10/2012 | Kelly et al. ...................... 463/37 |

* cited by examiner

*Primary Examiner* — Ronald Laneau
(74) *Attorney, Agent, or Firm* — Weide & Miller, Ltd.

(57) ABSTRACT

In accordance with the invention a player may change the size of or "scale" first game information which is displayed by one or more video displays of a wagering gaming machine relative to other displayed game information. In a preferred embodiment, the size of primary game information such as the images of playing cards or the like may be changed relative to secondary game information such as pay table, credit, and other information. The player may change the scale of displayed game information via player input, such as to a touch screen which overlays a displayed graphical slider. The size of the game information may change proportional to the distance of player input to the touch screen.

13 Claims, 6 Drawing Sheets

GAMING MACHINE WITH PLAYER SCALABLE VIDEO-DISPLAYED GAME ELEMENTS

FIELD OF THE INVENTION

The present invention relates generally to gaming machines which present games and, in particular, gaming machines which utilize one or more video displays to display game information to a player.

BACKGROUND OF THE INVENTION

Traditional gaming machines were slot-type machines which utilized spinning mechanical reels. Those reels had slot symbols printed on them and the symbols were thus of a fixed size.

Later, electronic gaming machines were developed and these gaming machines have become the mainstay of casinos. These machines utilize one or more electronic video displays to display images of slot symbols, playing cards and the like. These machines can be programmed to display a variety of information in a variety of layouts.

Relative to a video poker game, regular video poker players regularly achieve play rates of approximately 600 hands per hour. Due to the physical location of player seating and input controls (e.g., buttons on a slot machine button deck), the player's facial proximity to the video display is approximately 15-24 inches.

The trend in gaming is towards gaming machines having larger video displays. For example, a 22-inch diagonal video display is fairly common today. From the manufacturer and operator perspective, it is desirable to have the same machine be able to present multiple games and game types (e.g., video slots, video poker, keno, etc. on the same gaming device).

Video poker players often use peripheral vision to determine card values, including not only the card rank (e.g., 2, 5, Q, A, etc.) but also color and suit (e.g., red heart, black club, etc.). Displaying normal full size cards on such a large video display, given the close viewing position of the player, leads to a field of view (for the cards) which is too wide for the player to always perceive all of the displayed cards. In that event, a player may be forced to visually scan the cards from one side to the other rather than being able to perceive all of the cards at the same time. This is tiring to the player and slows down the game play.

There are several problems associated with addressing this problem. First, not all players sit the same distance from the video display of the gaming machine. Second, not all players have the same level of peripheral vision. Third, not all players have the same level of eyesight generally. For example, one option for the game designer is to reduce the size of all of the information which is displayed. However, some players may then find that the size of various information is so small that it is no longer readable.

SUMMARY OF THE INVENTION

The present invention relates to gaming machines which utilize one or more video displays to display game information. In one embodiment, the size of first displayed game information may be change or scaled relative to other displayed game information. In a preferred embodiment, the size of primary game information such as the images of playing cards or the like may be changed or scaled relative to secondary game information such as pay table, credit, and other information.

In one embodiment, a player may provide input to the gaming machine to change the size of the primary game information. In a preferred embodiment, the player may provide input to a touch screen associated with the video display. The player's input may be made relative to a displayed graphical input element, such as a graphically displayed slider. Movement of the player's input to the touch-screen may effect a change in position of the displayed slider and also effect a proportional or corresponding change in the size of the displayed primary game information.

In one preferred embodiment a player may move a slider between first and second positions. The first slider position may correspond to a first game information size, such as a minimal displayed playing card size. The second slider position may correspond to a second game information size, such as a maximized displayed playing card size. Slider positions between the first and second positions may correspond to one or more intermediate game information sizes, such as intermediate displayed playing card sizes. In a preferred embodiment, changes in the size of displayed primary game information, such as the size of displayed playing cards, is effected without changing the size of secondary displayed game information.

In accordance with the invention, a player of a wagering gaming machine may provide input to the gaming machine to customize the size of displayed primary game information. This permits, for example, a player to select a displayed card size which best suits the player. Such a size may not only permit the player to easily focus on and distinguish each card, but quickly view a number of cards at the same time.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a method of scaling, i.e. changing the size of, displayed wagering game information.

In a preferred embodiment, the method comprises scaling the size of displayed playing cards. Other aspects of the invention comprise a gaming machine which is configured to scale displayed game information, preferably in response to player input.

Figure 1:
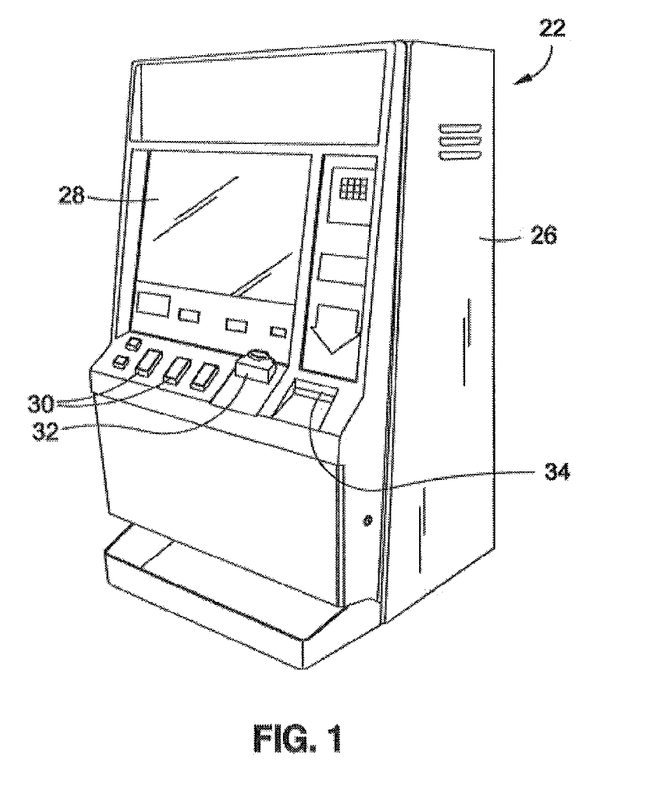
FIG. 1 illustrates one embodiment of a gaming machine at which the invention may be implemented.

The invention has particular utility to wagering game information which is displayed by at least one video display of a gaming machine or device. One configuration of a gaming machine is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type or other configuration as is well known to those of skill in the art).

The gaming machine 22 preferably includes at least one display device 28 configured to display game information. The display device 28 may be a mechanical, electro-mechanical or electronic display, such as one or more rotating reels, a video display or the like. When the display device 28 is an electronic video display, it may comprise a cathode ray tube (CRT), a high resolution flat panel liquid crystal display (LCD), a projection LCD, a plasma display, a field emission display, a digital micro-mirror display (DMD), a digital light processing display (DLP), an LCD touch screen, a light emitting display (LED or OLED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events.

As described in more detail below, the gaming machine 22 is preferably configured to present one or more games upon a player making a monetary payment or wager. In this regard, as described in more detail below, the gaming machine 22 includes means for accepting monetary value.

In one embodiment, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game (such as spin slot reels or display cards in a video poker game), to indicate cards to be held or discarded in a game of video draw poker, to "cash out" of the gaming machine, or to provide various other inputs.

In one preferred embodiment, the gaming machine 22 includes at least one microprocessor or controller for controlling the gaming machine, including receiving player input and sending output signals for controlling the various components of the machine 22 (such as generating game information for display by the display 28 or otherwise causing game information to be displayed by the at least one display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information representing images of displayed cards, as disclosed below), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. This software may be configured to implement the game described below, such as in the form of one or more steps. The memory may also store other information, such as pay table information, card images or the like. The gaming machine 22 may also include one or more random number generators for generating random numbers, such as for use in selecting, cards or the like for presenting the game in a random fashion.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine). In one embodiment, the gaming machines 22 may be game kiosks or interfaces.

As indicated, the gaming machine 22 is configured to present one or more wagering game. Thus, the gaming machines 22 is preferably configured to accept value, such as coins, paper currency or other elements or devices representing value such as monetary funds. For example, as illustrated in FIG. 1, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22, such as by dispensing coins to a coin tray. In another embodiment, funds may be issued by dispensing paper currency. In yet another embodiment, a player may be issued a media, such as a printed ticket, which ticket represents the value which was paid or cashed out of the machine.

The gaming machine or device 22 may include other features. For example, the gaming machine 22 may include other displays, light, speakers for generating sounds.

In one preferred embodiment, the general electronic configuration of the gaming device is that of a processor/controller, memory device for storing program code or other data, main display device, optional secondary display device, sound card, speakers and one or more input devices. The processor is preferably a microprocessor or a microcontroller capable of displaying images, symbols and other indicia such as the faces and backs of cards. The memory device can include random access memory (RAM) for saving or accessing game data generated or used during a game. The memory device can also include read only memory (ROM) for storing program code which controls the gaming device so that a particular game is loaded and plays in accordance with appropriate game rules and paytables. Although the processor and memory device preferably reside on each gaming device, it is also possible to provide at least some of their functionality at a central location such as a network server for communication to a playing station such as over a local area network (LAN), wide area network (WAN), Internet connection or other wireless link. With regard to generating random events (e.g., the dealing of cards), it is possible for this to occur locally (e.g., at or within the gaming device) or non-locally (e.g., centrally at a server accessed by wire or wirelessly), or a combination thereof.

It will be appreciated that the gaming machine illustrated in FIG. 1 is only exemplary of one embodiment of a gaming machine. For example, it is possible to for the gaming machine to have various other configurations, including different shapes and styles and having different components than as just described. For example, while the gaming machine or device may be standalone, it may be server-based, server-assisted, linked to other gaming devices, connected to a server, progressive controller (wide-area or local-area), or be handheld and/or wireless. In particular in the case of online wagering, the gaming device may be a computer, mobile phone, or microprocessor-driven device which is programmed to accept wagers, e.g. via downloadable software.

In one embodiment, the gaming machine 20 is configured to display primary and secondary game information via the at least one video display 28. Primary game information preferably comprises information which determines or comprises the outcome of the game. In the case of a video poker game, the primary game information comprises images of playing cards. In the case of a video slot game, the primary game information comprises one or more slot symbols. Other primary game information may comprise, but is not limited to, images of one or more dice and the like.

The gaming machine 20 is preferably also configured to display secondary game information. Secondary game information may be used to present a game, but may be secondary to the primary game information. For example, secondary game information may comprise, but is not limited to, player credit or wager/bet information, credit denomination, active pay lines, pay tables, instructions or help information, menus, icons, artwork and other information.

One embodiment of a method of scaling game information and a gaming machine configured to scale game information, preferably in response to player input, will now be described. In one embodiment of the invention, first game information may be scaled relative to second game information. In a preferred embodiment, the first game information comprises primary game information and the second game information comprises secondary game information.

In one embodiment of the invention, the method comprises receiving input from a player regarding desired scaling and then scaling the first information in response to that input. In a preferred embodiment, first game information is scaled or re-sized in response to a player input, while the size of the second game information remains unchanged. Preferably degree of scaling is proportional to an aspect of the player input, such as the duration or distance of player input (i.e. a greater degree of input effects a greater degree in the change in size).

A player may provide scaling input to the gaming machine via one or more input devices. Such an input device may comprise an electro-mechanical slider, an electro-mechanical button, a joystick, or in a preferred embodiment, a touch screen. Preferably the touch screen is associated with the video display which is displaying the game information which is to be scaled.

In one embodiment, the size of the first game information may be scaled between a first, small size and second, larger size. The first information may be scaled infinitely between the first and second sizes or it might be scaled to particular sizes (such as in one or more steps or increments) between the first and second sizes. The first and second sizes may vary, such as depending upon the size of a primary game information display area or window, as detailed below. In one embodiment, the first size may be about 50% of the second size, though the proportion of the sizes may vary.

Figure 2A:
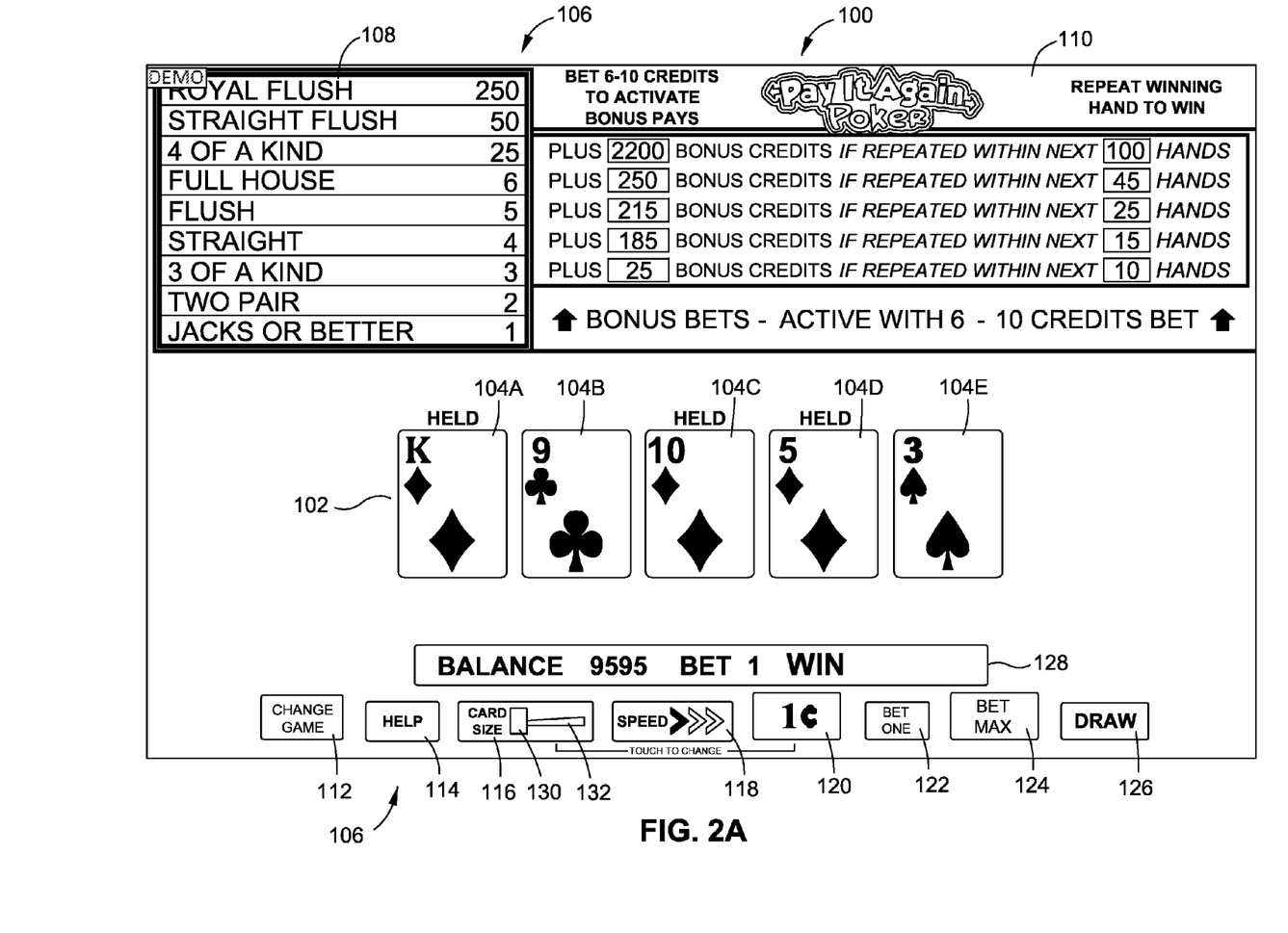
FIG. 2A illustrates one example of displayed game information wherein playing cards are displayed face-up in a small size or scale relative to other displayed game information, based upon a first player input.

One preferred embodiment of the invention will be described with reference to FIGS. 2A-2E. FIG. 2A illustrates a video display 100 of a gaming machine. As illustrated, the video display is displaying primary game information 102 in the form of the images of five playing cards 104A-E. The video display is also displaying secondary game information 106 in the form of pay table 108, bonus pay table 110, change game button 112, help button 114, card size slider 116, game speed selector 118, denomination indicator 120, button one button 122, bet max button 124, deal button 126, and game information display 128 which displays information about the outcome of the game, the number of credits belonging to the player and the current bet size.

In this embodiment, the gaming machine is configured to present a video poker game in which cards are displayed. As illustrated, five cards may be displayed laterally or in a row. Of course, the cards or other primary game information 102 could be displayed in other arrangements or might comprise other information, such other numbers of cards as described in more detail below. In addition, it will be appreciated that the secondary game information 106 may also vary from that illustrated, including the particular content and arrangement of that information.

As indicated, one aspect of the secondary game information 106 comprises an image of a slider 116. In one embodiment, a player may provide input to the gaming machine by touching an area of a touch screen which overlies the image of the slider 116.

In a preferred embodiment, the image of the slider 116 may include an image of a slide 130. The user may touch the touch screen in the area of the slide 130 and, by changing the position of the touch such as by sliding their finger linearly along the touch screen, changing the displayed position of the slide 130 (wherein the player's input to the touch screen comprises an input to the gaming machine controller or a video controller which then causes the video display 100 to display an image of the slider 116 with a changed slide 130 position).

Figure 2B:
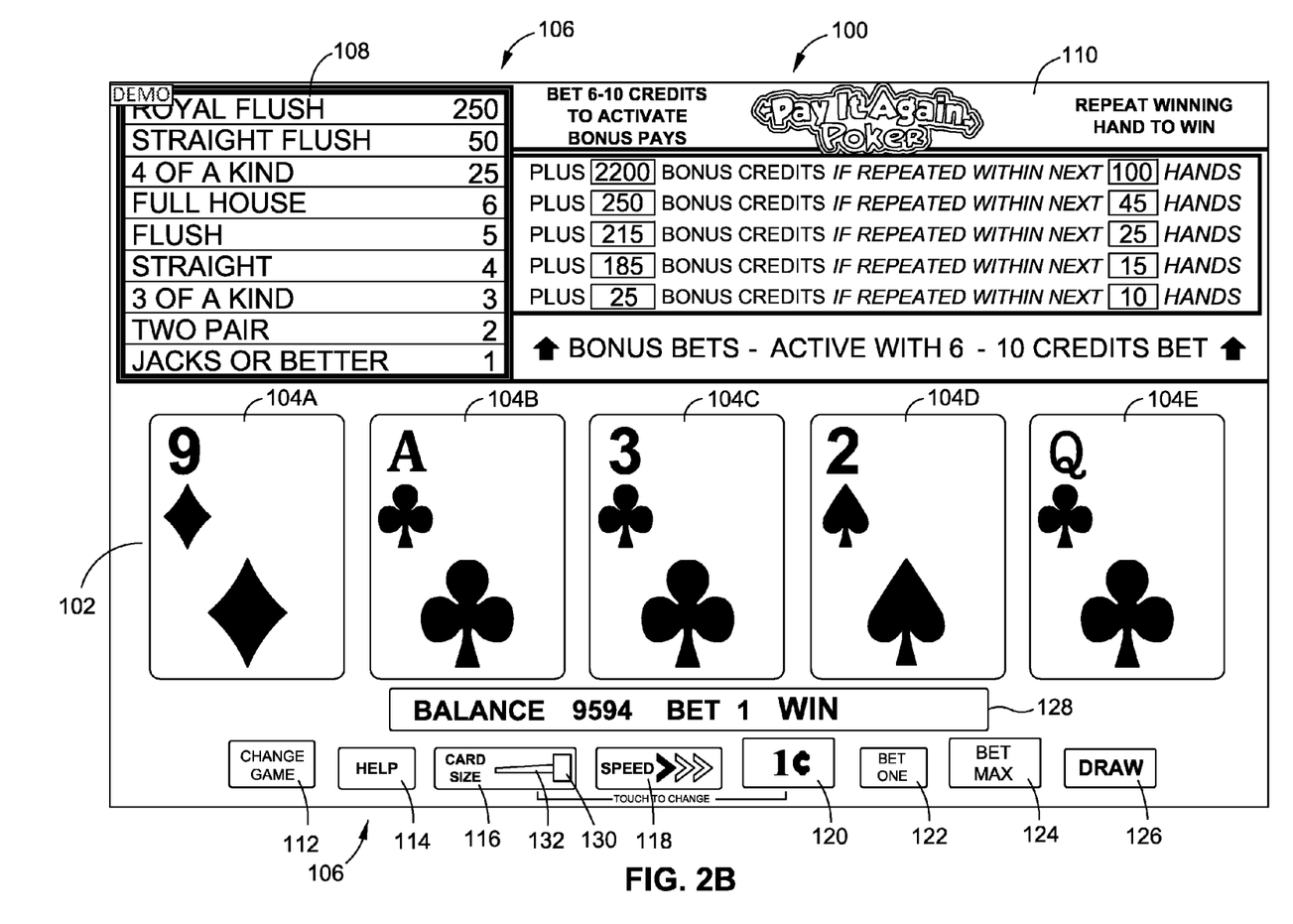
FIG. 2B illustrates another example of displayed game information wherein playing cards are displayed face-up in a large size or scale relative to other displayed game information, based upon a second player input.
Figure 2C:
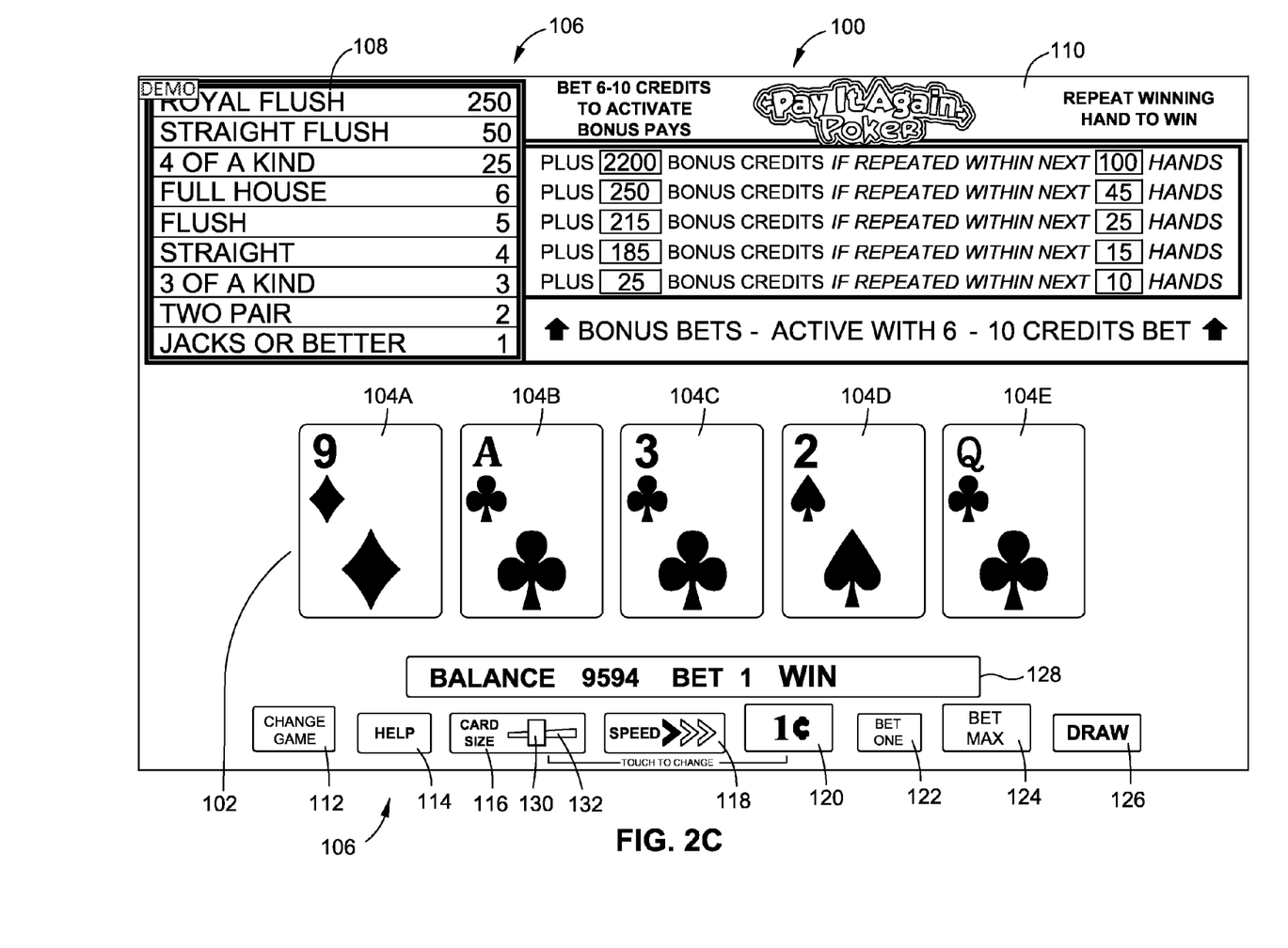
FIG. 2C illustrates another example of displayed game information wherein playing cards are displayed face-up in an intermediate size relative to other displayed game information, based upon a third player input.

In addition, based upon the player's input, the size of the primary game information 104 is changed. In a preferred embodiment, the primary game information 104 may be changed between a first small size which corresponds to a first position of the slide 130, such as the far left-most position of the slider (as illustrated in FIG. 2A), and a second large size which corresponds to second position of the slide 130, such as the far right-most position of the slider (as illustrated in FIG. 2B). In addition, the size of the primary game information 104 may be changed between the first and second sizes when the position of the slide 130 is between the first and second positions, such as a middle or intermediate position of the slide 130 (as illustrated in FIG. 2C). Of course, the slide 130 might be moved to other positions between the first and second positions.

Figure 2D:
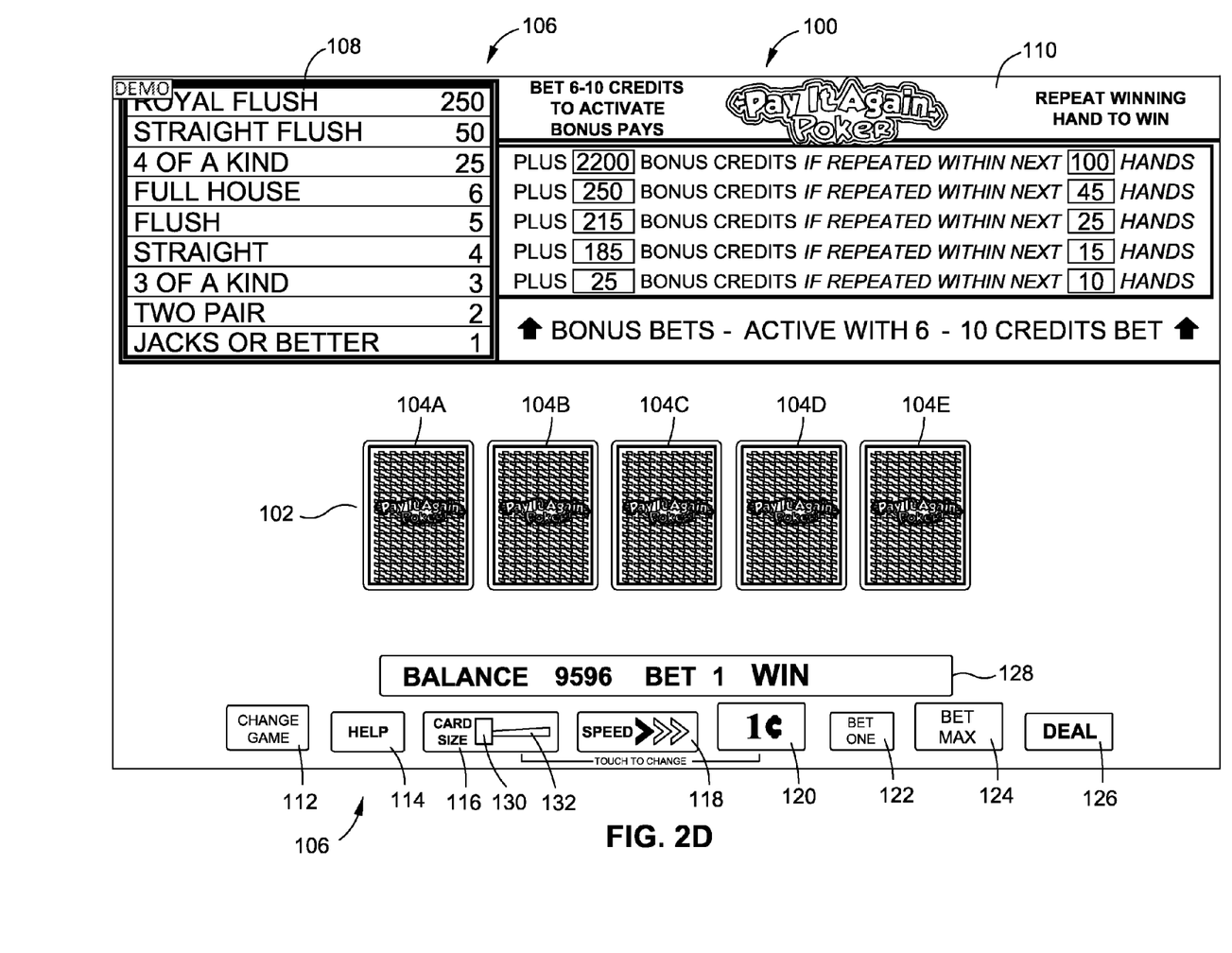
FIG. 2D illustrates one example of displayed game information wherein playing cards are displayed face-down in a small size or scale relative to other displayed game information, based upon a first player input.
Figure 2E:
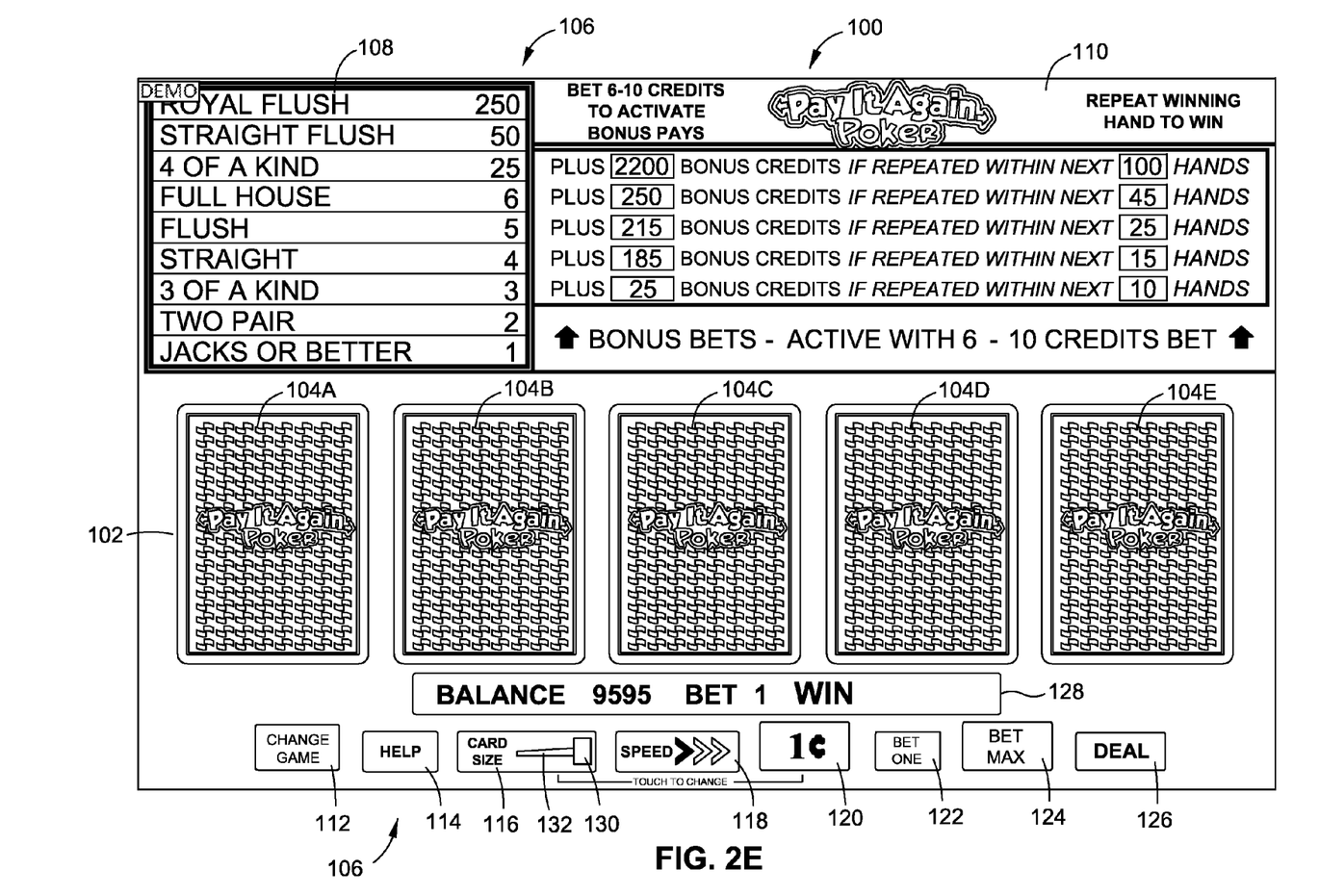
FIG. 2E illustrates another example of displayed game information wherein playing cards are displayed face-down in a large size or scale relative to other displayed game information, based upon a second player input.

As is well known, playing cards ordinarily have a first side which displays card value information (the card face) and a second side which does not display card value information (the card back). In one embodiment, the size of the playing cards 104A-E may be adjusted whether or not they are in their face-up or face-down position. For example, as illustrated in FIG. 2D, if the slide 130 is moved to the left-most position, the size of the cards is minimized even when the cards are displayed in their face down position. As illustrated in FIG. 2E, if the slide 130 is moved to the right-most position, the size of the cards is maximized, even when the cards are displayed in their face down position.

In one embodiment, other primary game information may be scaled. For example, as illustrated in FIG. 2A, during play of a video poker game a player may make "hold" selections relative to one or more dealt cards. Upon making a "hold" selection of a particular card, the word "hold" or a similar indicator may be provided relative to that card. In one embodiment, this associated primary game information 104 may be scaled just as with the size of the card itself.

Additional aspects of the invention will now be appreciated.

First, it will be appreciated that the slider 116 need not have the configuration as illustrated in FIGS. 2A-2E. For example, the slider 116 could be arranged vertically or in other orientations. The size of the slider 116 might also vary. Further, as indicated above, other types of player input devices might be provided for receiving scaling input.

In a preferred embodiment, a player may provide input to increase the size of displayed game information (such as by moving the slider 130 to the right as illustrated in FIGS. 2A-2E) or provide input to decrease the size of displayed game information (such as by moving the slide 130 to the left as illustrated in FIGS. 2A-2E). Thus, a player might increase the size of displayed game information if the player perceives the information as being undesirably small, or decrease the size of displayed game information if the player perceives the information as being undesirably large. Most preferably, however, while the size of the first or primary game information may be scaled by the player, the size of the secondary game information does not change. This ensures that the size of the second game information does not become too small to read or become so large that it no longer fits on the display.

In one embodiment, a player may scale or change the size of displayed game information at any time. In other embodiments, a player might only be permitted to scale or change the size of displayed game information at certain times. For example, a player might only be permitted to scale or change the size of displayed game information at the beginning of a game, such as when the bet is placed or before the player presses the "deal" button or the like. If the game is at a phase at which the player is not permitted to change the scale, the slider may be locked or it might not even be displayed to the player.

In one embodiment, as illustrated, an indicator may be provided to the player which indicates the type of input the player must provide in order to increase or decrease the size of displayed game information. For example, the slider 116 may include a slot 132. The width of the slot 132 at the left side may be smaller than the width of the slot 132 at the right side, thus providing an indication to the player that movement of the slide 130 to the left corresponds to a small scale and that movement of the slide 130 to the right corresponds to a large scale. Of course, other indicators such as text or labels may be utilized to provide this information to the player.

In one embodiment, when the slider 116 is activated, the slide 130 may change color or change other attribute. In this manner, the player knows that their input has been received by the slide 116 (other than by seeing a change in the size of the displayed game information).

Of course, the size and position of the slide 130 may vary. The appearance of the slide 130 might also vary. For example, the slide 130 might be displayed as a round button. Further, as indicated above, a physical electro-mechanical slide or other device might be used instead.

In one embodiment, one slider might be utilized to increase the size of displayed game information and another slider might be utilized to decrease the size of displayed game information.

In one embodiment, a player might change the size of displayed game information by touching a "increase card size" button displayed on the video display and decrease the size of displayed game information by touching a "decrease card size" button. The length of time that the player touches either button may determine the extent of enlargement or reduction.

In one embodiment, the size of displayed game information is changed relative to a window or area. For example, as illustrated in FIGS. 2A-2E, the playing cards 104A-2E may be displayed in a main card area 134. In one embodiment, the size of this area remains constant, such as defined by a number of pixels (in the x and y directions). The images of the cards 104A-E may be changed relative to that main card area 134, wherein if the size of the cards is increased, the number of pixels comprising the main card area 134 that are utilized to display the card images increases. Likewise, if the size of the cards is reduced, the number of pixels comprising the main card area 134 that are utilized to display the card images decreases (wherein the remaining pixels may be displayed as a blue background or the like).

It will be appreciated that aspects of the invention comprise methods of changing the size of displayed wagering game information, including methods of receiving input from a player of a desired game information scale, plus gaming machines configured to scale displayed game information, preferably in response to player input thereto.

The invention may be implemented in various manners. In one embodiment, the video scaling may be implemented by the gaming controller and/or a video controller of a gaming machine. The controller of the gaming machine may implement various now known or later developed video scaling technology or techniques, such as software, in order to effect a change in the size of display graphical information.

Of course, the aspects of the invention may be applied to information which is displayed by a single video display of a gaming machine or to two or more video displays. Also, the aspects of the invention might be applied to "secondary" or "bonus" displays of a gaming machine. For example, a gaming machine might utilize one or more electro-mechanical reels to display primary game information and utilize a video display to display bonus game information. Such bonus game information might comprise a card game in which a plurality of cards is displayed. The one or more secondary or bonus displays might be located in a top box of the gaming machine or other area.

In accordance with the invention, a player of a wagering gaming machine may provide input to the gaming machine to customize the size of displayed primary game information. This permits, for example, a player to select a displayed card size which most suits the player. Such a size may not only permit the player to easily focus on and distinguish each card, but quickly view a number of cards at the same time.

It will be appreciated that while in one embodiment the displayed primary game information may comprise five (5) playing cards, the primary game information might comprise other information, particularly depending upon the game which is being presented. For example, the gaming machine might be configured to preset a three card poker game (in which three playing cards are displayed in a row) or a seven card poker game (in which seven playing cards are displayed in a row). In the former case, the player might select a larger card size because such still permits the player to view all three cards at the same time. In the latter case, the player might select a smaller card size to permit the player to view all seven cards at the same time. Of course, the player's desired scaling input may be determined by the layout of the primary game information.

While the examples illustrating the game and its play and different options for methods of execution are explained throughout the preceding disclosure, skilled artisans will appreciate that many variations of the design will be possible. The invention as described therefore is not limited to the specific examples cited, as those skilled in the art will be able to apply the instant invention in other embodiments as a matter of design choice. The specific examples of equipment and play should not be considered limiting. Rather, the invention is to be afforded the breadth and scope as found in the attached claims.

What is claimed is:

1. A method of scaling game information displayed by at least one video display of a gaming machine comprising:
    displaying at least primary and secondary game information via said at least one video display of said gaming machine, said primary and secondary game information displayed in a first size; and
    receiving input from a player via at least one input of said gaming machine, said input comprising input regarding a desired size of said displayed primary game information;
    changing a size of said displayed primary game information from a first size to a second size and displaying said primary game information via said at least one video display in said second size while maintaining said size of said displayed secondary game information.

2. The method of claim 1 wherein said input device comprises a touch screen associated with said at least one video display.

3. The method of claim 2 further comprising the step of displaying a graphical slider on said at least one video display and wherein said step of receiving input comprises receiving a player touch of said touch screen in the area of said slider.

4. The method of claim 1 wherein said primary game information comprises an image of at least one playing card.

5. The method of claim 4 wherein said secondary game information is selected from the group consisting of: a pay table, a bonus table, a credit balance, a help button, instructions, and one or more input icons.

6. A gaming machine comprising:
    a housing;
    a wager accepting device;
    at least one video display;
    at least one user input; and
    at least one controller configured to cause said at least one video display to display primary and secondary game information in a first size and to display said primary game information in a second size different from said first size based upon player input regarding a desired size to said at least one user input while said size of said secondary game information remains constant.

7. The gaming machine in accordance with claim 6 wherein said at least one controller is configured to change said size of said displayed primary game information in proportion to said input by said player to said at least one user input.

8. The gaming machine in accordance with claim 7 wherein said input comprise a linear distance of travel.

9. The gaming machine in accordance with claim 8 wherein said at least one user input comprises a touch screen and said linear distance of travel comprises a distance over said touch screen.

10. The gaming machine in accordance with claim 6 wherein said first size is small and said second size is large.

11. The gaming machine in accordance with claim 6 wherein said gaming machine is configured to present a video poker game and said primary game information comprises an image of at least one playing card.

12. The gaming machine in accordance with claim 6 wherein said secondary game information is selected from the group consisting of: a pay table, a bonus table, a credit balance, a help button, instructions, and one or more input icons.

13. The gaming machine in accordance with claim 6 wherein said at least one controller is configured to cause said at least one video display to display a graphical image of a slider having a slide, wherein a first position of said slide corresponds to said first size and said second position of said slide corresponds to said second size.

* * * * *